(No Model.)
T. LUCE.
FILTER.
No. 347,432. Patented Aug. 17, 1886.
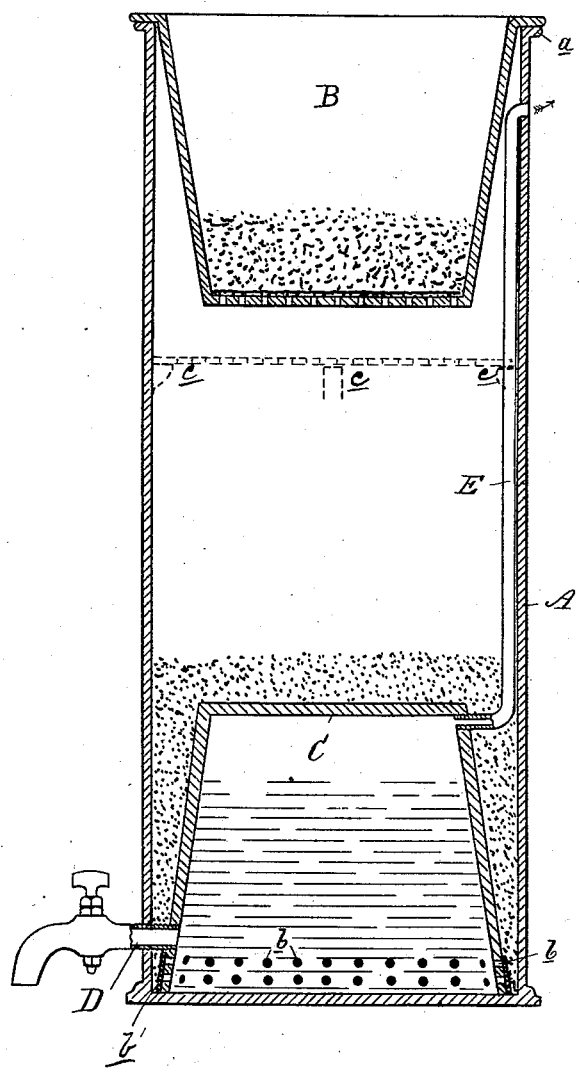
Attest:
John Schuman.
Inventor:
Theodore Luce.
By his Atty
Thos. S. Sprague

UNITED STATES PATENT OFFICE.

THEODORE LUCE, OF DETROIT, MICHIGAN.

FILTER.

SPECIFICATION forming part of Letters Patent No. 347,432, dated August 17, 1886.

Application filed December 3, 1885. Serial No. 184,546. (No model.)

*To all whom it may concern:*

Be it known that I, THEODORE LUCE, of Detroit, in the county of Wayne and State of Michigan, have invented new and useful Improvements in Filters; and I do hereby declare that the following is a full, clear, and exact description thereof, reference being had to the accompanying drawing, which forms a part of this specification.

This invention relates to a new article of manufacture for water-filtering purposes.

It is highly desirable for the public health that all water designed for being taken internally by the human race should be filtered and cleansed as thoroughly as is possible from all impurities which are productive of disease by means which are as economical in cost and simple in construction as it is possible to obtain to produce the desired result.

It is the object of this invention to produce such device which will thoroughly perform the functions required of it, and which will be so economical in cost as to bring it within the reach of nearly all classes.

The invention consists in the peculiarities of construction of the various parts and their combinations, as more fully hereinafter set forth.

In the accompanying drawing, which forms a part of this specification, my invention is shown in central vertical section and in its simplest form, and in this drawing, A represents a preferably cylindrical-shaped vessel or jar with a tight bottom, made of terra-cotta, with an overhanging ledge, *a*, around its top, to support the top of the jar B, and the bottom of this vessel is perforated with small holes, as shown. Upon the upper side of the bottom of this vessel a covering of asbestus paper or other filtering-paper is placed, above which, to a suitable depth, the vessel is filled with proper sand for filtering purposes.

*c* are lugs on the interior of the jar A, and are designed to support a finely-perforated shelf, (shown in dotted lines,) to support filtering material. This will be necessary when the vessel B is omitted; but I prefer to use the vessel B as shown, for by this arrangement the vessel, with its contents, may be easily removed when the filtering material has become full of impurities. As shown in the drawing, an inverted vessel, C, also made of terra-cotta, is set upon the bottom of the jar, and in this case the periphery of the vessel near its open end is provided with perforations *b*, which are covered upon their outer side by filtering-paper, with properly-prepared sand interposed between the filtering-paper and the walls of the jars, above which the space surrounding the vessel C is filled with properly-prepared charcoal for the purpose.

D is a suitable outlet-pipe, through which the water may be drawn, and E is an air-pipe communicating with the chamber C, and leading upward nearly or quite to the top of the jar A.

In practice, the device being constructed as described, water is put into the chamber B, and is freed from its larger impurities as it passes through the sand, filtering-paper, and perforations into the next chamber immediately below, whence it passes through the charcoal, sand, filtering-paper, and perforations into the vessel C, when it is ready for use, the air-pipe E preventing the compression of air in such chamber by allowing the air to be forced out by the incoming water, and at all times preserving an equal and atmospheric pressure upon the surface of the water. It will readily be seen by this construction that the interior portions may be easily removed whenever it is necessary to clean such interior or to wash the filtering material to get rid of the impurities which have been deposited therein.

I deem it important that the filtering-paper *b'* cover the perforations *b* in the base of the vessel C, and be placed between the wall of said vessel and the filtering material in the vessel A, thus preventing the filtering material in the vessel A from entering the vessel C through said perforations.

What I claim as new is—

The combination, with the jar A, of the inverted vessel C, set upon the bottom thereof, and provided with perforations *b* near its base, the filtering material in said jar and the filtering-paper *b'* covering said perforations, and preventing the filtering material from entering the vessel C through said perforations, substantially as described.

THEODORE LUCE.

Witnesses:
H. S. SPRAGUE,
CHARLES J. HUNT.